(12) United States Patent
Choi et al.

(10) Patent No.: US 10,884,263 B2
(45) Date of Patent: Jan. 5, 2021

(54) HEAD-MOUNTED DISPLAY AND IMAGING APPARATUS FOR DISPLAYING IMAGE THEREOF

(71) Applicant: HTC Corporation, Taoyuan (TW)

(72) Inventors: Iok Kan Choi, Taoyuan (TW); Po-Sen Yang, Taoyuan (TW); Yu-Heng Chen, Taoyuan (TW); Ling-Yi Ding, Taoyuan (TW)

(73) Assignee: HTC Corporation, Taoyuan (TW)

( * ) Notice: Subject to any disclaimer, the term of this patent is extended or adjusted under 35 U.S.C. 154(b) by 204 days.

(21) Appl. No.: 16/182,611

(22) Filed: Nov. 7, 2018

(65) Prior Publication Data
US 2020/0041806 A1 Feb. 6, 2020

Related U.S. Application Data

(60) Provisional application No. 62/712,985, filed on Aug. 1, 2018.

(51) Int. Cl.
*G02B 30/52* (2020.01)
*G02F 1/29* (2006.01)

(52) U.S. Cl.
CPC ............ *G02B 30/52* (2020.01); *G02F 1/29* (2013.01); *G02F 2001/294* (2013.01)

(58) Field of Classification Search
CPC .. G02F 1/29; G02F 2001/294; G02F 2203/28; G02B 3/14; G02B 26/127
USPC ........................................................ 359/319
See application file for complete search history.

(56) References Cited

U.S. PATENT DOCUMENTS

| 8,743,270 B2 * | 6/2014 | Hamada | H04N 5/23212 |
| | | | 348/349 |
| 2006/0050016 A1 | 3/2006 | Tomisawa et al. | |
| 2009/0009594 A1 * | 1/2009 | Kawai | H04N 13/302 |
| | | | 348/54 |

(Continued)

FOREIGN PATENT DOCUMENTS

| TW | 200835322 | 8/2008 |
| TW | M416768 | 11/2011 |

(Continued)

OTHER PUBLICATIONS

"Office Action of Taiwan Counterpart Application", dated May 8, 2019, pp. 1-8.

(Continued)

*Primary Examiner* — Mohammed A Hasan
(74) *Attorney, Agent, or Firm* — JCIPRNET

(57) ABSTRACT

A head-mounted display and an imaging apparatus for displaying image thereof are provided. The imaging apparatus includes a first display, a second display, and a first focus adjusting apparatus. The first display generates a first sub-image; wherein the first sub-image is located on a first imaging plane, and is then projected to the target system. The second display generates a second sub-image; wherein the second sub-image is located on a second imaging plane, and is then projected to the target system. The first focus adjusting apparatus is in front of the second display, and is used to adjust the position of the second imaging plane. The first imaging surface and a second imaging surface are overlapped or non-overlapped.

6 Claims, 5 Drawing Sheets

(56) References Cited

U.S. PATENT DOCUMENTS

2011/0164311 A1* 7/2011 Morikuni .............. G02B 17/08
359/364
2018/0035103 A1 2/2018 Sung et al.

FOREIGN PATENT DOCUMENTS

WO 2006061959 6/2006
WO 2013025530 2/2013

OTHER PUBLICATIONS

"Search Report of Europe Counterpart Application", dated Jul. 31, 2019, p. 1-p. 8.

* cited by examiner

HEAD-MOUNTED DISPLAY AND IMAGING APPARATUS FOR DISPLAYING IMAGE THEREOF

CROSS-REFERENCE TO RELATED APPLICATION

This application claims the priority benefit of U.S. provisional application Ser. No. 62/712,985, filed on Aug. 1, 2018. The entirety of the above-mentioned patent application is hereby incorporated by reference herein and made a part of this specification.

BACKGROUND

Technical Field

The invention relates to a head-mounted display and an imaging apparatus for displaying image thereof, and more particularly, to a head-mounted display and an imaging apparatus for displaying image thereof capable of dynamically adjusting display modes.

Description of Related Art

Along with advancement of electronic technology, in terms of the research and development of displays, significant changes are observed. In today's electronic products, providing display devices featuring high resolution is an inevitable trend. Especially in the head-mounted displays used for virtual reality display and augmented reality display, since soft and hardware resources are both limited, how to increase resolution of the display images, or how to provide three-dimensional visual effect of high quality is an important issue for designers in this field.

SUMMARY

The invention provides a head-mounted display and an imaging apparatus for displaying image thereof capable of adjusting operation modes, so as to provide image resolution or provide a depth display effect.

The invention provides an imaging apparatus for displaying image including a first display, a second display, and a first focus adjusting apparatus. The first display generates a first sub-image; wherein the first sub-image is located on a first imaging plane, and is then projected to the target system. The second display generates a second sub-image; wherein the second sub-image is located on a second imaging plane, and is then projected to the target system. The first focus adjusting apparatus is in front of the second display, and is used to adjust the position of the second imaging plane. The first imaging surface and a second imaging surface are overlapped or non-overlapped.

The invention further provides a head-mounted display including a housing and at least one imaging apparatus for displaying image as described above. The imaging apparatus for displaying image is disposed in the housing.

Based on the above, in the invention, the position of the second imaging plane of the second sub-image generated by the second display is adjusted through the focus adjusting apparatus, and the first imaging plane and the second imaging plane may be overlapped or non-overlapped. When the first imaging plane and the second imaging plane are overlapped, the image resolution is increased; when the first imaging plane and the second imaging plane are non-overlapped, the depth of the display image is increased. In this way, the imaging apparatus for displaying image is a dual-state and adjustable optical imaging apparatus featuring super resolution and depth, which greatly enhances the visual effect.

To make the aforementioned more comprehensible, several embodiments accompanied with drawings are described in detail as follows.

DESCRIPTION OF THE EMBODIMENTS

Figure 1:
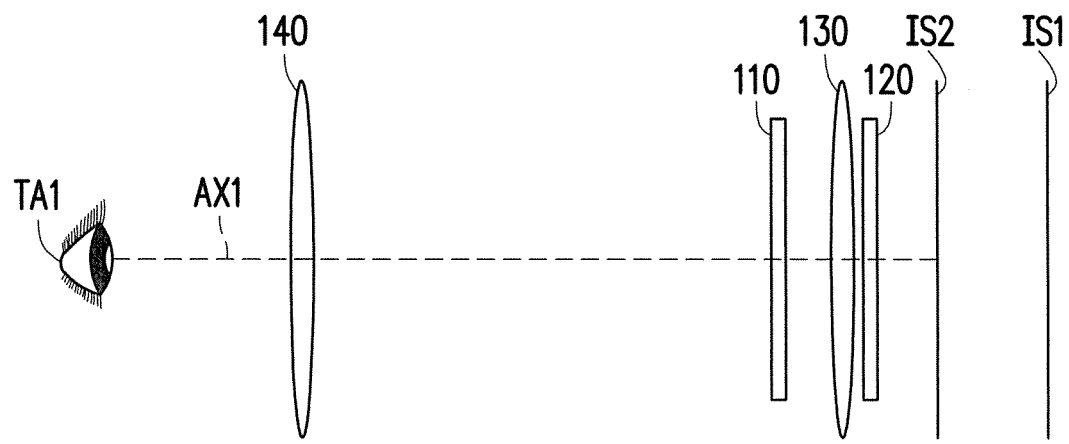
FIG. 1 is a schematic diagram illustrating an imaging apparatus for displaying image according to an embodiment of the invention.

With reference to FIG. 1, FIG. 1 is a schematic diagram illustrating an imaging apparatus for displaying image according to an embodiment of the invention. An imaging apparatus for displaying image 100 includes a first display 110, a second display 120, a lens set 140, and a focus adjusting apparatus 130. In this embodiment, the lens set 140, the first display 110, the focus adjusting apparatus 130, and the second display 120 may arranged in sequence along a same axis AX1, and the axis AX1 passes through a target system TA1.

The first display 110 generates an image on a first imaging plane IS2. The second display 120 generates an image on a second imaging plane IS1. In this embodiment, the target system TA1 is a position where the user's eyes or the image sensor system is located. The first display 110 and the second display 120 respectively generate a first sub-image on the first imaging plane and a second sub-image on the second imaging plane, and the first sub-image and the second sub-image are then projected to a target zone TA1. Through the lens set 140, the first display forms a virtual image on the first imaging plane IS2, and the second display forms another virtual image on the second imaging plane IS1.

It is worth noting that, the focus adjusting apparatus 130 is disposed in front of the second display 120, and through modulation of a focal length of the focus adjusting apparatus 130, a position of the second imaging plane IS1 is thereby changed. The focus adjusting apparatus 130 may enable the second imaging plane IS1 and the first imaging plane IS2 to be overlapped or may enable the second imaging plane IS1 and the first imaging plane IS2 to be non-overlapped through providing a spacing therebetween.

Figure 2:
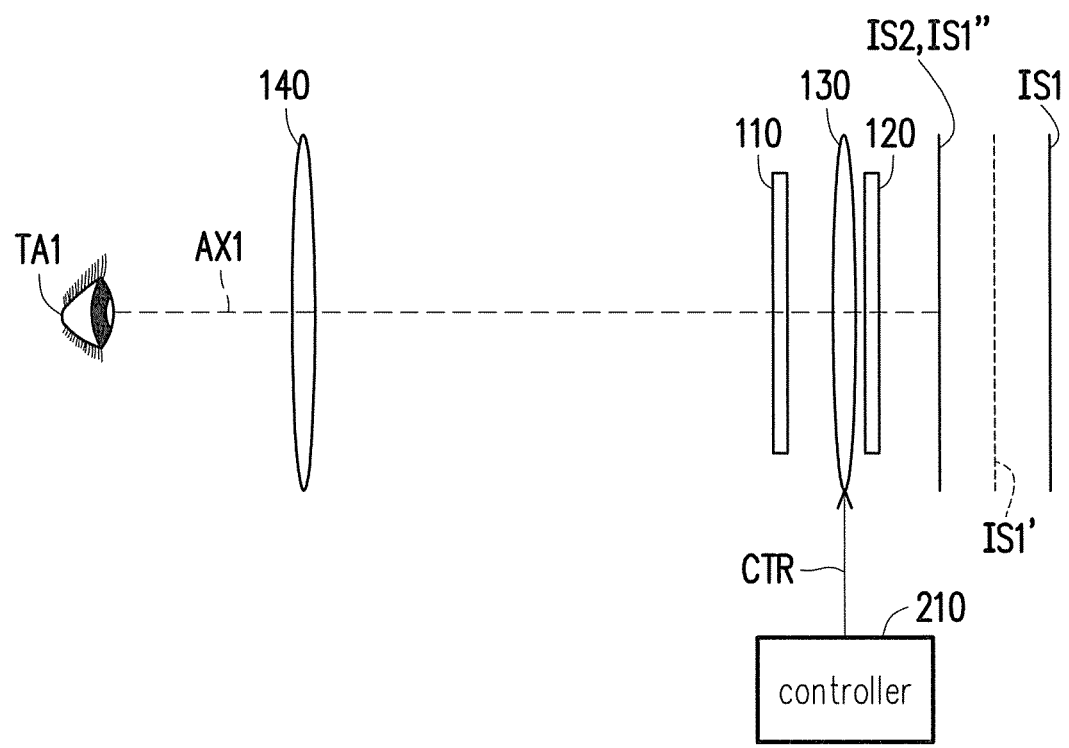
FIG. 2 is a schematic diagram illustrating an adjustment operation of a second imaging plane according to an embodiment of the invention.

For details of the operation of the focus adjusting apparatus 130, please refer to FIG. 2 for a schematic diagram illustrating adjustment operation of a second imaging plane according to an embodiment of the invention. In FIG. 2, the imaging apparatus for displaying image 100 further includes a controller 210. The controller 210 is coupled to the focus adjusting apparatus 130 and provides a control signal CTR to the focus adjusting apparatus 130. The focus adjusting apparatus 130 may be an electrically-controlled liquid crystal lens (or an electrically-controlled liquid crystal lens array), and a focal length of the electrically-controlled liquid crystal lens may be adjusted according to the control signal CTR. After the focal length of the focus adjusting apparatus 130 is adjusted, the second display generates a new image relationship, so as to change the position of the second imaging plane IS1, and in this way, the second imaging plane IS1 may be adjusted according to the control signal CTR.

In this embodiment, the original position of the second imaging plane IS1 may be different from a position of the first imaging plane IS2. Through the foregoing adjustment mechanism, the second imaging plane IS1 may be adjusted to an imaging plane IS1' so as to approach the first imaging plane IS2, or the second imaging plane IS1 may be adjusted to an imaging plane IS1" so as to be overlapped with the first imaging plane IS2. Certainly, in other embodiments, the original position of the second imaging plane IS1 may be same as the position of the first imaging plane IS2, such that the first imaging plane IS2 and the second imaging plane IS1 may be overlapped. Through the foregoing adjustment mechanism, the first imaging plane IS2 and the second imaging plane IS1 may be separated and non-overlapped.

Incidentally, the first display 110 and the second display 120 may be flat displays in this embodiment. The first imaging plane IS2 and the second imaging plane IS1 correspondingly generated respectively by the first display 110 and the second display 120 may be flat surfaces. In other embodiments of the invention, the first display 110 and the second display 120 may be displays having non-flat surfaces (e.g., may be curved displays), and under this condition, the first imaging plane IS2 and the second imaging plane IS1 correspondingly generated respectively by the first display 110 and the second display 120 may have curved surfaces. It is worth noting that, in this embodiment, the first display 110 may be a transparent display. In this way, the second display 110 may project an image twice to the target zone TA1 through the first display 110.

In addition, in this embodiment, the lens set 140 may include one or a plurality of lenses, and the lens set 140 represented by a convex lens in the drawings is depicted for illustration only, so it does not mean that the lens set 140 may only be constituted by a single convex lens.

The controller 210 may be a processor having operating capability. Alternatively, the controller 210 may be designed through hardware description language (HDL) or any other digital circuit design well known to people having ordinary skill in the art and may be a hardware circuit implemented through a field programmable gate array (FPGA), a complex programmable logic device (CPLD), or an application-specific integrated circuit (ASIC). In this embodiment, the controller 210 may generate the control signal CTR according to a display mode required to be executed by the imaging apparatus for displaying image 100. In terms of an analog control mode, the controller 210 may drive the focus adjusting apparatus 130 to adjust the position of the second imaging plane IS1 through voltage magnitude of the control signal CTR. In terms of a digital control mode, the controller 210 may transmit a value through the control signal CTR, enables the focus adjusting apparatus 130 to adjust the position of the second imaging plane IS1 according to the received value, and changes the spacing between the first imaging plane IS2 and the second imaging plane IS1. The relationship between the voltage magnitude of the control signal CTR and the transmitted value and the spacing between the first imaging plane IS2 and the second imaging plane IS1 may be determined by the designer and is not particularly limited.

Figure 3A:
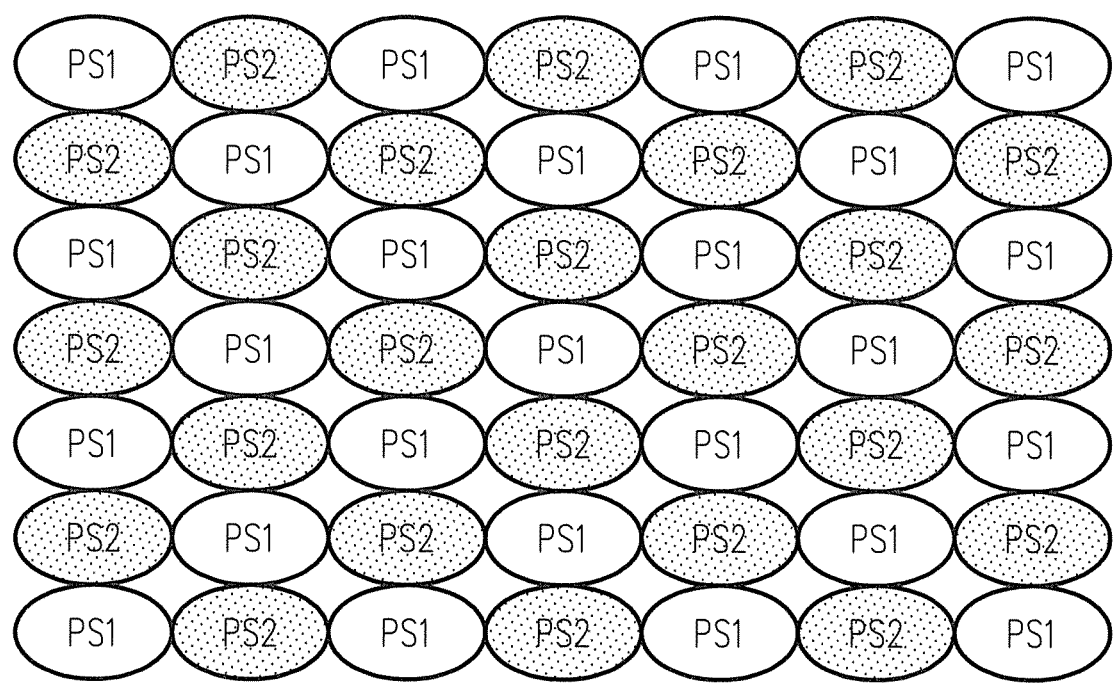
FIG. 3A and FIG. 3B are diagrams illustrating display images generated by the imaging apparatus for displaying image in different modes according to an embodiment of the invention.
Figure 3B:
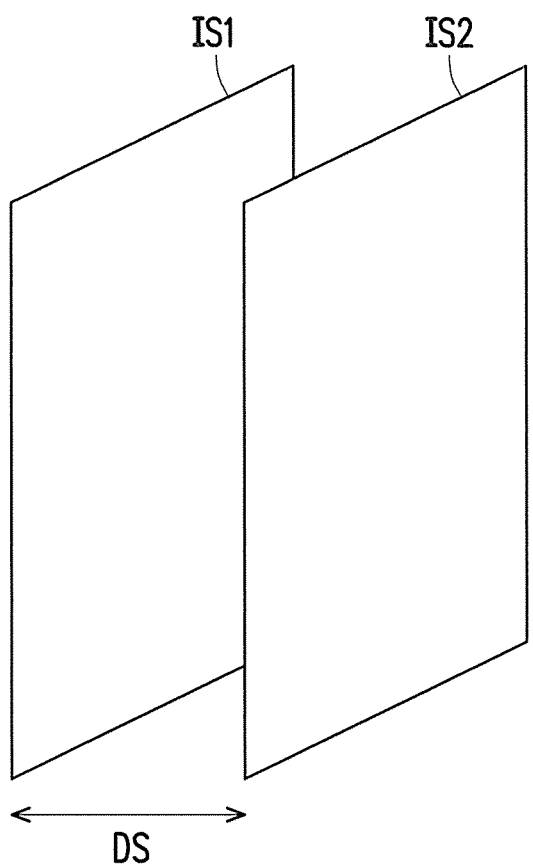

With reference to FIG. 3A and FIG. 3B next, FIG. 3A and FIG. 3B are diagrams illustrating display images generated by the imaging apparatus for displaying image in different modes according to an embodiment of the invention. In FIG. 3A, the first sub-image has a plurality of first display pixels PS1, and the second sub-image has a plurality of second display pixels PS2. The first display pixels PS1 in the first sub-image and the second display pixels PS2 in the second sub-image are arranged in an alternating manner. Under such condition, when the first imaging plane and the second imaging plane are overlapped, the alternately-arranged first display pixels PS1 and the second display pixels PS2 may be combined to form a high-resolution display image. That is, through the imaging apparatus for displaying image provided by the embodiments of the invention, the resolution of a display image may be generated and may be a sum of the resolution of the first display and the resolution of the second display.

In FIG. 3B, the first imaging plane IS2 and the second imaging plane IS1 are non-overlapped, and a spacing DS is provided therebetween. In this way, display images generated on the first imaging plane IS2 and the second imaging plane IS1 may have a depth difference, so that the visual effect of a three-dimensional image having a depth is generated.

Figure 4:
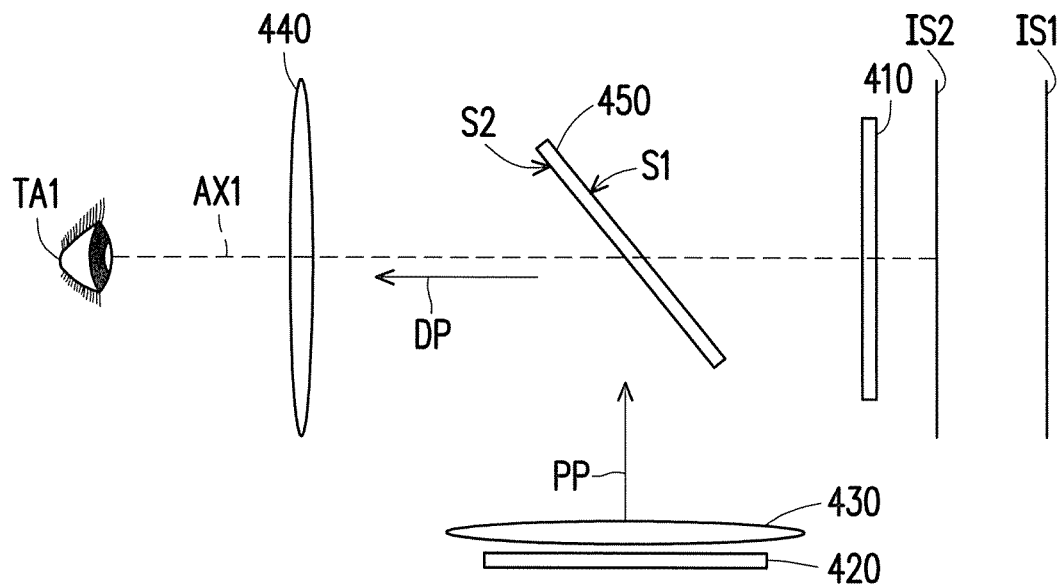
FIG. 4 is a schematic diagram of a display image generated according to another embodiment of the invention.

As shown in FIG. 4, a lens set 440, a light splitting element 450, and a first display 410 may be disposed in sequence along the axis AX1. The first display 410 generates an image on the first imaging plane IS2 through the light splitting element 450, and the image is then projected twice to the target system TA1. The second display reflects an image to the second imaging plane IS1, and the image is then projected twice to the target system TA1.

Similar to the foregoing embodiments, a focal length of the focus adjusting apparatus 430 may be adjusted to adjust the position of the second imaging plane IS1. When a spacing is provided between the second imaging plane IS1 and the first imaging plane IS2, an imaging apparatus for displaying image 400 may generate a display image having a depth. Conversely, when the second imaging plane IS1 and the first imaging plane IS2 are overlapped, the resolution of the display image generated by the imaging apparatus for displaying image 400 may be increased.

Figure 5:
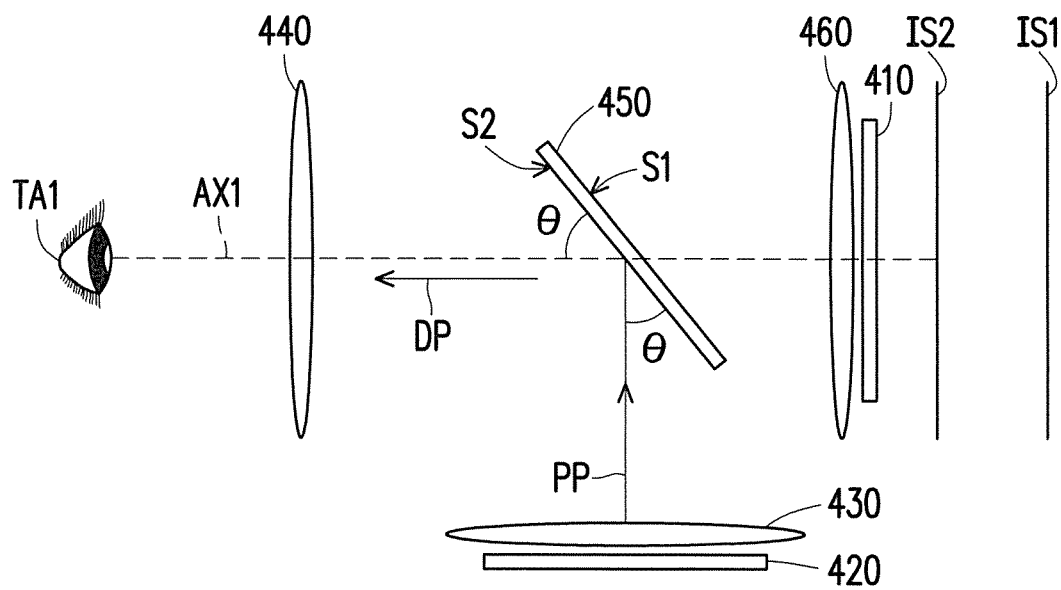
FIG. 5 is a schematic diagram illustrating an implementation of a light splitting apparatus according to an embodiment of the invention.

Regarding to the details of how a light splitting apparatus 450 is disposed, please refer to FIG. 5 for a schematic diagram illustrating an implementation of a light splitting apparatus according to an embodiment of the invention. In FIG. 5, the light splitting apparatus 450 may allow light from the first display 410 to pass through, and the light is imaged on the first imaging plane IS2. The light splitting apparatus 450 may also reflect light from the second display 420, and the light is imaged on the second imaging plane IS1. An included angle θ is provided between a second surface S2 of the light splitting apparatus 450 and an optical axis PP of the second display 420. In this embodiment, the included angle θ is between 5 degrees and 85 degrees.

From another perspective, in the embodiment of FIG. 5, another focus adjusting apparatus 460 may be disposed corresponding to the first display 410. The focus adjusting apparatus 460 may adjust the position of the first imaging plane IS2, so that the imaging apparatus for displaying image may have more flexibility in changing the positions of the imaging planes.

On the other hand, only one of the focus adjusting apparatus 460 and the focus adjusting apparatus 430 may be selected to be disposed, or the two apparatuses may be disposed together, which is not particularly limited.

Figure 6:
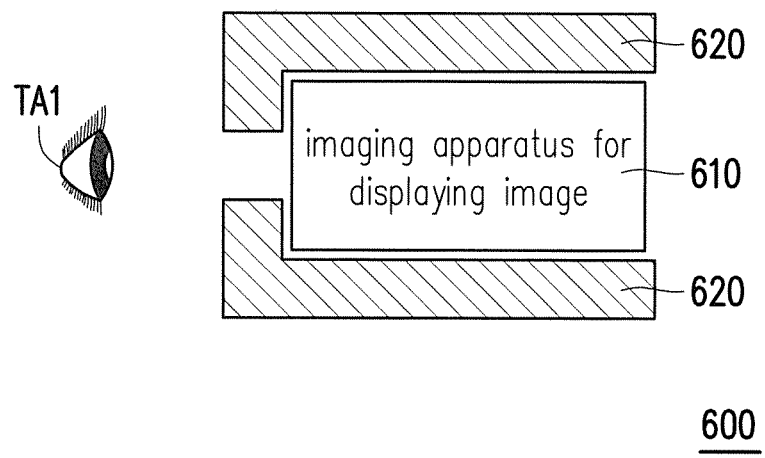
FIG. 6 is a schematic view illustrating a head-mounted display according to an embodiment of the invention.

With reference to FIG. 6, FIG. 6 is a schematic view illustrating a head-mounted display according to an embodiment of the invention. A head-mounted display 600 includes one or a plurality of imaging apparatuses for displaying image 610 and a housing 620. The imaging apparatus for displaying image 610 corresponds to the target system TA1 to be disposed in the housing 620.

The imaging apparatus for displaying image 610 in this embodiment may be implemented through the foregoing imaging apparatus for displaying image 100 or 400. Regarding to details of the operation of the imaging apparatus for displaying image 100 or 400, in the foregoing embodiments and implementation, detailed descriptions have been made, and will not be repeated here.

Based on the above, the imaging apparatus for displaying image provided by the invention, through focus adjustment of the focus adjusting apparatus 430, the imaging planes of the two sub-images generated by the two displays may be overlapped or may be separated from each other. In this way, the imaging apparatus for displaying image may feature different operation modes, so as to generate displays images featuring high resolution or generate three-dimensional images having the visual effect of depth. Performance of the imaging apparatus for displaying image is therefore effectively enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An imaging apparatus for displaying image, comprising:
   a first display, generating a first sub-image on a first imaging plane;
   a second display, generating a second sub-image on a second imaging plane; and
   a first focus adjusting apparatus, disposed in front of the second display, configured to adjust a position of the second imaging plane;
   wherein the first imaging plane and the second imaging plane are overlapped or non-overlapped, and
   wherein the first sub-image comprises a plurality of first display pixels, the second sub-image comprises a plurality of second display pixels, and the first display pixels and the second display pixels are arranged in an alternating manner when the first imaging plane and the second imaging plane are overlapped.

2. The imaging apparatus for displaying image as claimed in claim 1, further comprising:
   a controller, coupled to the first focus adjusting apparatus, the controller transmitting a control signal to the first focus adjusting apparatus,
   wherein the first focus adjusting apparatus adjusts the position of the second imaging plane according to the control signal.

3. The imaging apparatus for displaying image as claimed in claim 1, further comprising:
   a lens set, disposed on an imaging path of the first imaging plane and the second imaging plane, disposed adjacent to a target system.

4. The imaging apparatus for displaying image as claimed in claim 1, further comprising:
   a second focus adjusting apparatus, disposed on an imaging path of the first sub-image, configured to adjust a position of the first imaging plane.

5. A head-mounted display, comprising:
   a housing; and
   at least one imaging apparatus for displaying image as claimed in claim 1, disposed in the housing.

6. An imaging apparatus for displaying image, comprising:
   a first display, generating a first sub-image on a first imaging plane;
   a second display, generating a second sub-image on a second imaging plane; and
   a first focus adjusting apparatus, disposed in front of the second display, configured to adjust a position of the second imaging plane,
   wherein the first imaging plane and the second imaging plane are overlapped or non-overlapped; and
   a light splitting apparatus, disposed on an imaging path of the first sub-image and the second sub-image, configured to project the first sub-image to a target system; configured to generate a reflection path according to a projection path of the second sub-image, and configured to enable the second sub-image to be transmitted to the target system according to the reflection path,
   wherein the first imaging plane and the second imaging plane generate a three-dimensional image when the first imaging plane and the second imaging plane are non-overlapped, and
   wherein an included angle is provided between a surface of the light splitting apparatus and an optical axis of the second display, and the included angle is between 5 degrees and 85 degrees.

* * * * *